(12) United States Patent
Stack (10) Patent No.: US 11,766,128 B2
(45) Date of Patent: Sep. 26, 2023

(54) SEATING FURNITURE

(71) Applicant: Snug Shack Ltd., Essex (GB)

(72) Inventor: Simon Stack, Ilkeston (GB)

(73) Assignee: Snug Furniture Limited, Sunderland (GB)

( * ) Notice: Subject to any disclaimer, the term of this patent is extended or adjusted under 35 U.S.C. 154(b) by 0 days.

(21) Appl. No.: 17/588,410

(22) Filed: Jan. 31, 2022

(65) Prior Publication Data

US 2022/0240678 A1 Aug. 4, 2022

(30) Foreign Application Priority Data

Feb. 1, 2021 (EP) ..................................... 21154595

(51) Int. Cl.
*A47C 4/02* (2006.01)
*A47C 7/54* (2006.01)
*A47C 7/42* (2006.01)

(52) U.S. Cl.
CPC .................. *A47C 4/02* (2013.01); *A47C 7/42* (2013.01); *A47C 7/546* (2013.01)

(58) Field of Classification Search
CPC ........... A47C 4/02; A47C 4/021; A47C 4/028; A47C 7/42; A47C 7/546; A47C 7/00; A47C 7/02; A47C 17/02; F16B 12/34
See application file for complete search history.

(56) References Cited

U.S. PATENT DOCUMENTS

| 3,013,839 | A | * | 12/1961 | Syoc, Sr. | ................. | A47C 4/02 |
| | | | | | | 297/411.28 |
| 4,023,860 | A | * | 5/1977 | Harder, Jr. | ............. | B60N 2/242 |
| | | | | | | 297/283.3 |
| 4,365,840 | A | | 12/1982 | Kehl et al. | | |
| 11,484,122 | B2 | * | 11/2022 | Chen | ....................... | A47C 17/02 |
| 2020/0375362 | A1 | * | 12/2020 | Hale | ....................... | A47C 17/04 |
| 2021/0068547 | A1 | * | 3/2021 | Hodgson | ................... | A47C 7/42 |
| 2021/0274942 | A1 | * | 9/2021 | Ha | ......................... | A47C 17/02 |

FOREIGN PATENT DOCUMENTS

| AT | 292247 | B | | 8/1971 |
| CA | 2482583 | A1 | | 3/2003 |
| DE | 202020101720 | U1 | * | 6/2020 |
| GB | 440660 | A | | 1/1936 |

OTHER PUBLICATIONS

European Search Report dated Jul. 27, 2021, from the European Patent Office forpriority European application No. EP 21154595.9.

\* cited by examiner

*Primary Examiner* — Milton Nelson, Jr.
(74) *Attorney, Agent, or Firm* — Reising Ethington P.C.

(57) ABSTRACT

A seating furniture with a base member, an armrest member and first and second mounting devices that fix the armrest member to the base member in a horizontal direction. The first mounting device is slidable in parallel to an inner surface of the armrest member between an upper position and a lower position. When positioned in the upper position, an angled part of the first mounting device is rotatable relative to the armrest member between a locking position and a release position. In the locking position a first flange portion of the first mounting device is positioned such that an upper edge of the base member may be received into a gap between the first flange portion and the inner surface of the armrest member, whereas in the release position the first flange portion is positioned to release the upper edge of the base member from the gap.

14 Claims, 6 Drawing Sheets

SEATING FURNITURE

CROSS-REFERENCE TO RELATED APPLICATIONS

This application claims the benefit of European Patent Application No. 21154595.9 filed Feb. 1, 2021, the disclosure of which is incorporated by reference as if fully set forth in detail herein.

FIELD

The present disclosure relates to a seating furniture, in particular a sofa or an armchair. A mounting device for such a seating furniture is also provided.

BACKGROUND

This section provides background information related to the present disclosure which is not necessarily prior art.

A seating furniture can include a base member, a backrest member, and/or at least one armrest member. The base member typically extends in a horizontal plane and defines a seating surface for a person to sit on. If included, the backrest member and the armrest member are mounted to the base member via first and second mounting devices, which can be complicated in view of either design or handling. These first and second mounting devices can be costly and/or inconvenient to assemble and disassemble.

Therefore, one object of the present disclosure is to provide a seating furniture that allows quick and easy assembly, such as the quick and easy mounting of the armrest member to the base member, while at the same time being cost efficient and reliable.

SUMMARY

This section provides a general summary of the disclosure, and is not a comprehensive disclosure of its full scope or all of its features.

A seating furniture can include a base member, a backrest member, and/or at least one armrest member. More specifically, while the seating furniture preferably comprises both a backrest member and an armrest member, the seating furniture might also include only one or the other, i.e. only the backrest member or only the armrest member.

The base member typically extends in a horizontal plane and defines a seating surface for a person to sit on. The base member can include a floor support, such as a pedestal, configured for direct stand and support on the floor. The backrest member, if included, can be mounted to the base member, such as in a detachable manner. The armrest member, if included, can be mounted to the base member, such as in a detachable manner. The armrest member may be mounted to the base member by at least one first mounting device and at least one second mounting device, preferably in a tool-free manner, in order to simplify assembly and disassembly of the seating furniture.

It is also possible to employ the first and second mounting devices to mount the backrest member to the base member. To facilitate readability the disclosure is described herein primarily in connection with the first and second mounting devices mounting the armrest member to the base member. However, all embodiments described herein might also be applied vis-à-vis to the first and second mounting devices mounting the backrest member to the base member.

The first mounting device is spaced from the second mounting device in a vertical direction, i.e. the space between the first mounting device and the second mounting device has a vertical component. The first mounting device fixes the armrest member to the base member with respect to at least one horizontal direction, preferably with respect to the horizontal width direction and/or transverse to the plane of the armrest member. The second mounting device fixes the armrest member to the base member with respect to the at least one horizontal direction, preferably with respect to the horizontal plane, preferably in a latching, e.g. snapping or ratcheting, manner.

The object of providing a seating furniture that allows quick and easy assembly while being cost efficient and reliable is achieved in that the first mounting device comprises an angled part, preferably with an L-, C-, N- or Z-shaped profile, having a web portion and at least a first flange portion. The angled part is mounted to the armrest member, preferably to the inner surface of the armrest member facing the base member and/or any opposite armrest member, in such a way that the web portion extends away from the inner surface of the armrest member and the first flange portion extends spaced from the inner surface of the armrest member by a gap, preferably parallelly spaced from the inner surface of the armrest member. The angled part is mounted to the armrest member in such a way that the angled part is slidable in parallel to the inner surface of the armrest member, preferably in the vertical direction, between and upper position and a lower position. The angled part is mounted to the armrest member in such a way that at least in the upper position the angled part is rotatable relative to the armrest member about an axis of rotation transverse, preferably perpendicular, to the inner surface of the armrest member between a locking position and a release position. In the locking position the first flange portion, and thus the gap, extends downwards from the web portion, preferably vertically downwards, to receive an upper edge of a lateral side of the base member in the gap between the first flange portion and the inner surface of the armrest member. In the release position the first flange portion, and thus the gap, extends sidewards or upwards, i.e. not downwards, from the web portion to release the upper edge of the lateral side of the base member from the gap, so that the armrest member can be moved away from the base member at the first mounting device.

When the seating furniture is to be assembled and the armrest member is to be mounted to the base member, first and second mounting devices are each brought into engagement. To engage the first mounting device, the angled part is slid into the upper position and rotated into the release position. Then, the armrest member is positioned with its inner surface against the lateral side of the base member, such that the upper edge of the lateral side of the base member is positioned below the angled part. Now, the angled part is rotated downwards into the locking position and subsequently slid downwards into the lower position, so that the upper edge of the base member is received in the gap, and the first flange portion holds and secures the upper edge and thus the entire base member against the armrest member in the horizontal width direction. Before or after the engagement of the first mounting device, preferably before the engagement of the first mounting device, the second mounting device is engaged, preferably by latching a latch connection, to provide a further horizontal fixture of the armrest member against the base member.

In such a way, a quick and easy mounting of the armrest member to the base member is enabled, which in turn enables a quick and easy assembly and disassembly of the seating furniture. At the same time, a reliable connection between the armrest member and the base member is established at reasonable costs. Further, flexibility for reconfiguring the seating furniture is achieved, thus making it fully modular and adaptable.

In one form, the angled part has a second flange portion, preferably in parallel to the first flange portion, at the end of the web portion opposite from the first flange portion. Preferably, the angled part has a C-, N- or Z-shaped profile. The second flange portion is mounted to the inner surface of the armrest member. In such a way, the second flange portion can be used as a mounting fitting and guiding plate.

The second flange portion may be mounted to the inner surface of the armrest member by a pin extending, preferably perpendicularly, from the inner surface of the armrest member and engaging with a hole in the second flange portion. By such pin and hole a simple rotatable and slidable connection can be formed.

The hole may be a slotted hole, for example with a longitudinal extension in the vertical direction, so that the second flange portion, and thus the entire angled part, can be slid relative to the pin in a way guided along the slotted hole, and preferably only at a predefined section of the slotted hole, can be rotated within the slotted hole. By such a slotted hole a simple rotatable and slidable connection can be formed.

The hole may have a key-hole shape with a slot portion at the upper end and a round portion at the lower end. The pin has a non-circular cross section, such as a square, rectangular, elliptic or oval cross section, having at least two different diameters including a greater diameter and a smaller diameter. The hole and the pin are formed such that the width of the slot portion is greater than the smaller diameter but smaller than the greater diameter of the pin, so that the pin fits in the slot portion along the smaller diameter but not along the greater diameter and cannot be rotated in the slot portion. The diameter of the round portion is greater than the greater diameter of the pin, so that the pin can be rotated in the round portion. In such a way, the pin cannot be rotated relative to the angled part as long as it is in the upper position in the slot portion, but can be rotated relative to the angled part when it is in the lower position in the round portion.

The pin may have a square-shaped cross section with the greater diameter in a diagonal direction, i.e. from one corner to the opposite corner, and the smaller diameter in a main direction parallel to a side and connecting two opposite sides of the square-shaped cross section. This means, when the pin is in the slot portion, the pin cannot be rotated fully, as the diagonal extension of the pin is greater than the width of the slot portion. However, in the round portion of the hole, the pin can be fully rotated. This relates to a very simple and effective pin and hole construction. Alternatively, the pin has an elongate cross section, such as a rectangular, oval or elliptic cross section, with the greater diameter in the vertical direction and the smaller diameter in the horizontal direction.

Optionally, the pin is mounted to the inner surface of the armrest member by a mounting plate on which the pin is formed and which is fixed to the inner surface of the armrest member, e.g. by screws. This results in a simple and reliable mounting of the pin.

Optionally, the gap to receive the upper edge of the base member is formed between the mounting plate and the first flange portion. This results in a simple and reliable construction.

Optionally, the pin has a mushroom shape with an extended-diameter head at its free end to secure the pin in the hole and prevent it from slipping out of the hole. This results in a simple and reliable construction.

In another form, the armrest member is mounted to the base member by at least two first mounting devices spaced from one another, preferably horizontally, along the upper edge of the base member. Preferably, both first mounting devices are formed according to an embodiment described above. By providing two first mounting devices a stable fixture of the armrest member to the base member in all directions can be achieved. Additionally or alternative, it is possible that two second mounting devices are provided.

Optionally, the second mounting device includes a latching connection, in particular in the form of a ratchet connection or a snap connection. Such a connection can be easily and quickly established without requiring any tools.

In one form, the second mounting device includes a crocodile clip mechanism comprising a first part mounted to preferably the bottom side of one of the base member and the armrest member, and a second part mounted to preferably the bottom side of the other one of the base member and the armrest member and engaging the first part. The first part includes a latch pin, preferably having a triangular cross section and preferably extending vertically downwards. The second part includes two opposite toothed latch elements, e.g. formed in a way of racks each including a linear rod with teeth at one longitudinal side, biased towards each other and engaging the latch pin from opposite sides with their teeth, so that after engagement relative movement of the first and second parts in a first direction into further engagement is permitted, while relative movement of the first and second parts in the opposite second direction out of engagement is inhibited. Such a crocodile clip mechanism relates to a very efficient latching mechanism.

In another form, the armrest member comprises a floor support, such as a pedestal, configured for direct stand and support on the floor. In such a way, the armrest member carries its own weight and the first and second mounting devices do not need to transfer vertical loads.

In another form, the backrest member is mounted to the base member by at least one bayonet bracket mechanism, preferably three bayonet bracket mechanisms spaced in the horizontal width direction of the seating furniture, including a first bayonet bracket mounted to the backrest member and a second bayonet bracket mounted to the base member. First and second bayonet brackets are engaged to one another in a sliding manner. In such a way, the backrest member can be slid in connection with the base member easily and quickly.

In another form, the backrest member is mounted to the base member by at least one bayonet bracket mechanism, preferably three bayonet bracket mechanisms spaced in the horizontal width direction of the seating furniture, including a first bayonet bracket mounted to the backrest member and a second bayonet bracket mounted to the base member. First and second bayonet brackets are engaged to one another in a sliding manner. In such a way, the backrest member can be slid in connection with the base member easily and quickly.

A further aspect of the present disclosure relates to a first mounting device for the seating furniture according to any of the embodiments described above, to fix the armrest member to the base member. The first mounting device comprises an angled part having a web portion and at least a first flange portion. The angled part is configured to be mounted to the armrest member in such a way that the web portion extends away from an inner surface of the armrest member and the first flange portion extends spaced from the inner surface of the armrest member by a gap. The angled part is configured to be mounted to the armrest member in such a way that the angled part is slidable in parallel to the inner surface of the armrest member between an upper position and a lower position. The angled part is configured to be mounted to the armrest member in such a way that at least in the upper position the angled part is rotatable relative to the armrest member about an axis of rotation transverse to the inner surface of the armrest member between a locking position and a release position. In the locking position the first flange portion extends downwards from the web portion to receive an upper edge of the base member in the gap between the first flange portion and the inner surface of the armrest member. In the release position the first flange portion extends sidewards or upwards from the web portion to release the upper edge of the base member from the gap. The features and effects described above in connection with the seating furniture can be applied vis-à-vis also to the first mounting device.

The present disclosure might also be transferred to the connection of two furniture components in general. In particular, the seating furniture according to the disclosure with the first and second mounting devices mounting the armrest member and/or the backrest member to the base member, might also be transferred to a general furniture piece wherein the first and second mounting devices mount a first furniture component to a second furniture component. This means, the seating furniture according to the disclosure would be a furniture piece, the base member according to the disclosure would be a first furniture component and the armrest member or the back rest member would be a second furniture component.

In particular, this would relate to a furniture piece comprises a first furniture component and a second furniture component. The first furniture component preferably extends in a horizontal plane and preferably carries a horizontal surface, e.g. for storage or support. The first furniture member preferably comprises a floor support, such as a pedestal, configured for direct stand and support on the floor. The second furniture component is mounted to the first furniture component, preferably in a detachable manner. Optionally, the second furniture component is mounted to the first furniture component by at least one first mounting device and at least one second mounting device, preferably in a tool-free manner, in order to simplify assembly and disassembly of the furniture piece.

The first mounting device is spaced from the second mounting device preferably in a vertical direction, i.e. the space between the first mounting device and the second mounting device has a vertical component. The first mounting device fixes the second furniture component to the first furniture component with respect to at least one horizontal direction, preferably with respect to the horizontal width direction and/or transverse to the plane of the second furniture component. The second mounting device fixes the second furniture component to the first furniture component with respect to the at least one horizontal direction, preferably with respect to the horizontal plane, preferably in a latching, e.g. snapping or ratcheting, manner.

The first mounting device comprises an angled part, preferably with an L-, C-, N- or Z-shaped profile, having a web portion and at least a first flange portion. The angled part is mounted to the second furniture component, preferably to the inner surface of the second furniture component facing the first furniture component and/or any opposite second furniture component, in such a way that the web portion extends away from the inner surface of the second furniture component and the first flange portion extends spaced from the inner surface of the second furniture component by a gap, preferably parallelly spaced from the inner surface of the armrest member. The angled part is mounted to the second furniture component in such a way that the angled part is slidable in parallel to the inner surface of the second furniture component, preferably in the vertical direction, between and upper position and a lower position. The angled part is mounted to the second furniture component in such a way that at least in the upper position the angled part is rotatable relative to the second furniture component about an axis of rotation transverse, preferably perpendicular, to the inner surface of the second furniture component between a locking position and a release position. In the locking position the first flange portion, and thus the gap, extends downwards from the web portion, preferably vertically downwards, to receive an upper edge of a lateral side of the first furniture component in the gap between the first flange portion and the inner surface of the second furniture component. In the release position the first flange portion, and thus the gap, extends sidewards or upwards, i.e. not downwards, from the web portion to release the upper edge of the lateral side of the first furniture component from the gap, so that the second furniture component can be moved away from the first furniture component at the first mounting device.

All embodiments of the disclosure described in connection with the seating furniture where the first and second mounting devices mount the armrest member and/or the backrest member to the base member, might also be transferred vis-à-vis to the general furniture piece where the first and second mounting devices mount the first furniture component to the second furniture component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
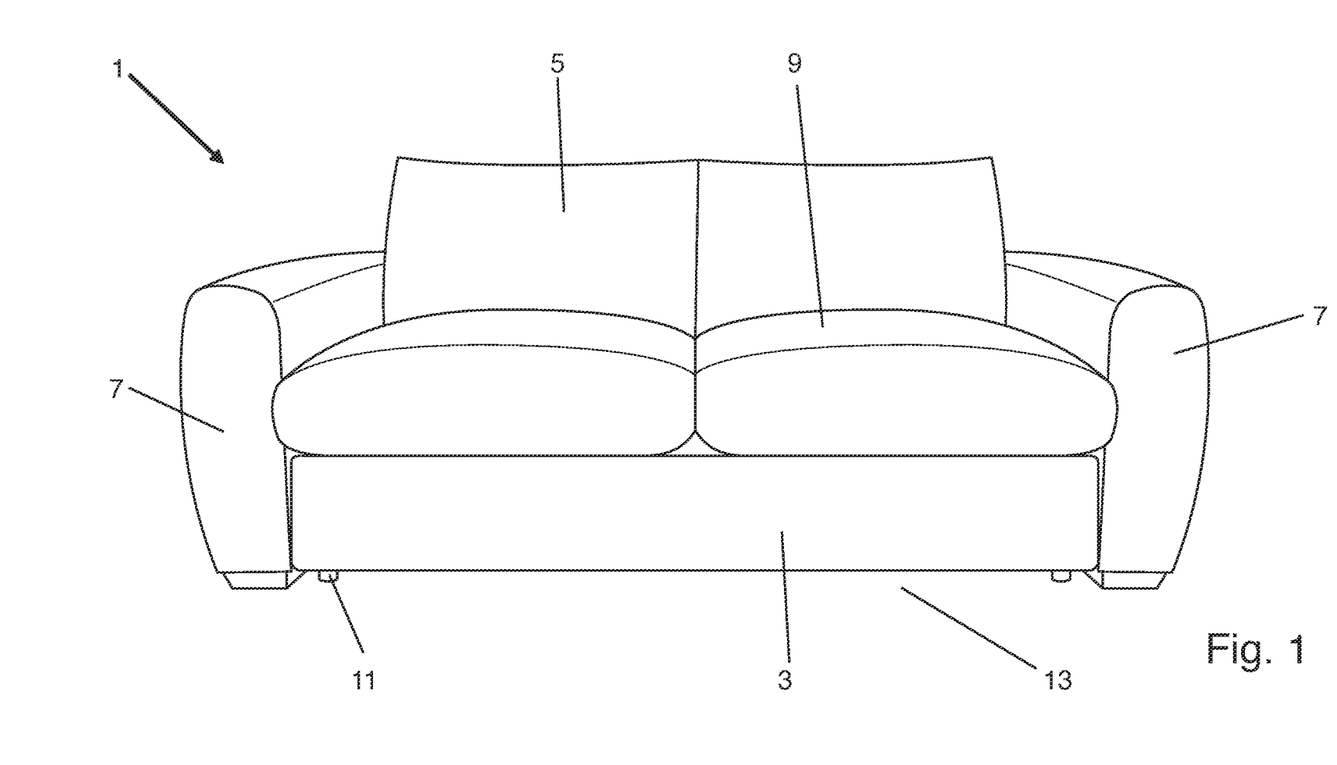
FIG. 1 is a front view of a seating furniture according to the disclosure.

In FIG. 1 a seating furniture 1 according to an embodiment of the present disclosure is shown. The seating furniture 1 is in the form of a sofa.

The seating furniture 1 comprises a base member 3, a backrest member 5, and two armrest members 7. The base member 3 extends in a horizontal plane and carries a seating surface 9 for a person to sit on. The base member 3 comprises a floor support 11 in the form of a pedestal, configured for direct stand and support on the floor 13. The backrest member 5 is mounted to the base member 3 in a detachable manner. The armrest members 7 are mounted to the base member 3 in a detachable manner.

Figure 2:
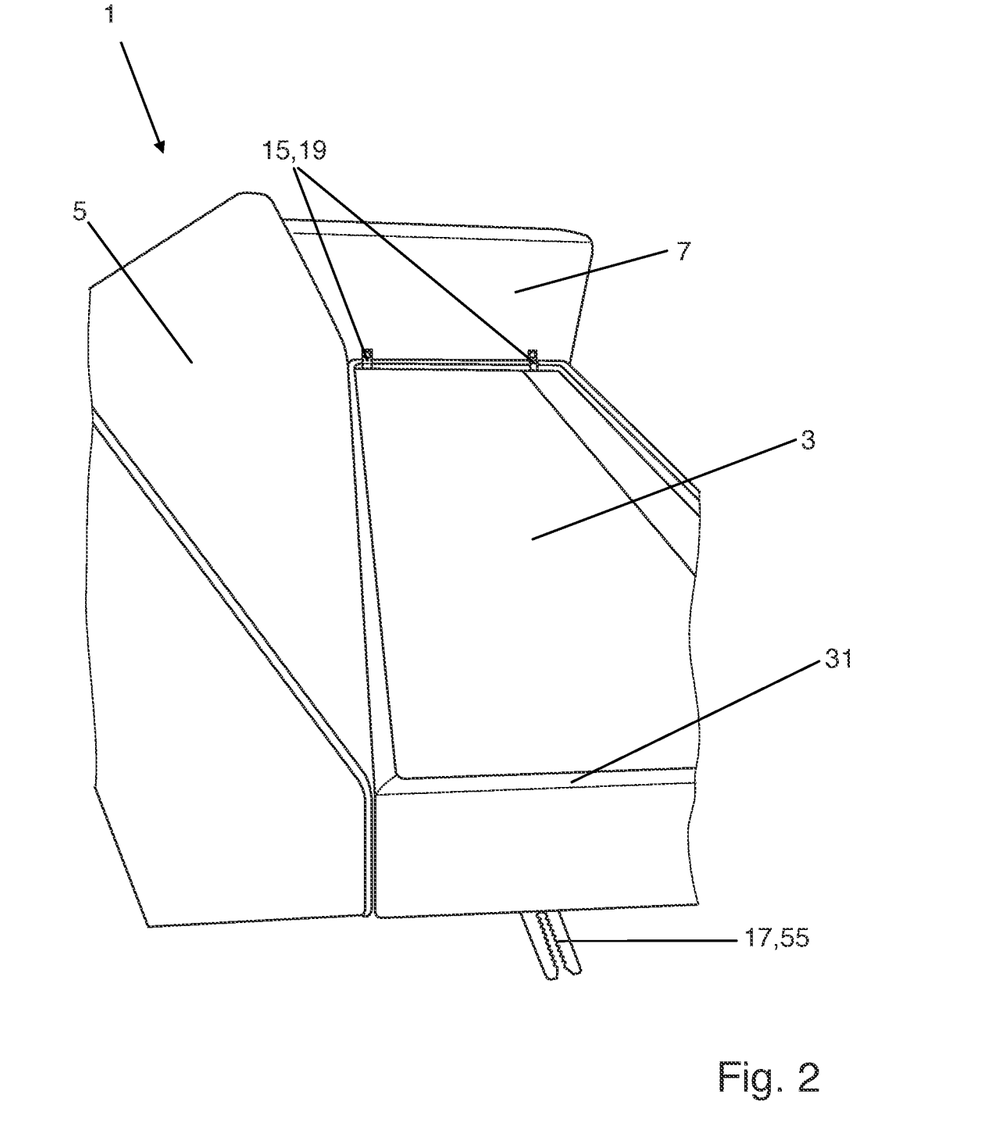
FIG. 2 is a perspective view of the seating furniture of FIG. 1 with the seat cushion and seating surface removed as well as one armrest member removed.

As shown in FIG. 2, each armrest member 7 is mounted to the base member 3 by two first mounting devices 15 and one second mounting device 17, in a tool-free manner in order to simplify assembly and disassembly of the seating furniture 1. The first mounting devices 15 are spaced from each other in the horizontal direction and are spaced from the second mounting device 17 in a vertical direction. The first mounting device 15 fixes the armrest member 7 to the base member 3 with respect to the horizontal width direction transverse to the plane of the armrest member 7. The second mounting device 17 fixes the armrest member 7 to the base member 3 with respect to the at least one horizontal direction in a latching, specifically ratcheting manner.

As shown in FIGS. 2 to 6, the first mounting device 15 comprises an angled part 19 with a Z-shaped profile having a web portion 21, a first flange portion 23, and a second flange portion 25. The angled part 19 is mounted to the inner surface 27 of the armrest member 7 facing the base member 3 and the opposite armrest member 7, in such a way that the web portion 21 extends away from the inner surface 27 of the armrest member 7 and the first flange portion 23 extends parallelly spaced from the inner surface 27 of the armrest member 7 by a gap 29. The angled part 19 is mounted to the armrest member 7 in such a way that the angled part 19 is slidable in parallel to the inner surface 27 of the armrest member 7 in the vertical direction between an upper position and a lower position. The angled part 19 is further mounted to the armrest member 7 in such a way that at least in the upper position the angled part 19 is rotatable relative to the armrest member 7 about an axis of rotation 28 perpendicular to the inner surface 27 of the armrest member 7 between a locking position and a release position.

In the locking position the first flange portion 23, and thus the gap 29, extends vertically downwards from the web portion 21 to receive an upper edge 31 of a lateral side of the base member 3 in the gap 29 between the first flange portion 23 and the inner surface 27 of the armrest member 7. In the release position the first flange portion 23, and thus the gap 29, extends sidewards or upwards, i.e. not downwards, from the web portion 21 to release the upper edge 31 of the lateral side of the base member 3 from the gap 29, so that the armrest member 7 can be moved away from the base member 3 at the first mounting device 15.

The second flange portion 25 is arranged in parallel to the first flange portion 23 at the end of the web portion 21 opposite from the first flange portion 23. The second flange portion 25 is mounted to the inner surface 27 of the armrest member 7 by a pin 33 extending perpendicularly from the inner surface 27 of the armrest member 7 and engaging with a hole 35 in the second flange portion 25. The hole 35 is in the form of a slotted hole with a longitudinal extension in the vertical direction, so that the second flange portion 25, and thus the entire angled part 19, can be slid relative to the pin 33 guided along the slotted hole. As particularly visible in FIG. 6, the hole 35 has a key-hole shape with a slot portion 37 at the upper end and a round portion 41 at the lower end. The pin 33 has a square-shaped cross section, having at least two different diameters including a greater diameter in a diagonal direction, i.e. from one corner to the opposite corner, and a smaller diameter in a main direction parallel to a side and connecting two opposite sides of the square-shaped cross section. The hole 35 and the pin 33 are formed such that the width of the slot portion 37 is greater than the smaller diameter but smaller than the greater diameter of the pin 33, so that the pin 33 fits in the slot portion 37 along the smaller diameter but not along the greater diameter and cannot be rotated in the slot portion 37. The diameter of the round portion 41 is greater than the greater diameter of the pin 33, so that the pin 33 can be rotated in the round portion 41. In such a way, the pin 33 cannot be rotated relative to the angled part 19 as long as it is in the upper position in the slot portion 37, but can be rotated relative to the angled part 19 when it is in the lower position in the round portion 41.

Figure 3:
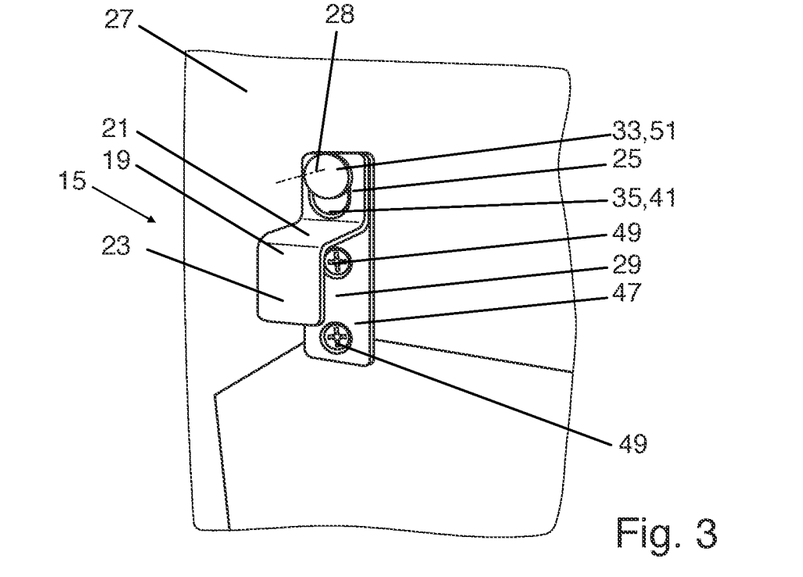
FIG. 3 is a detailed view of a first mounting device of the seating furniture of FIG. 1.
Figure 4:
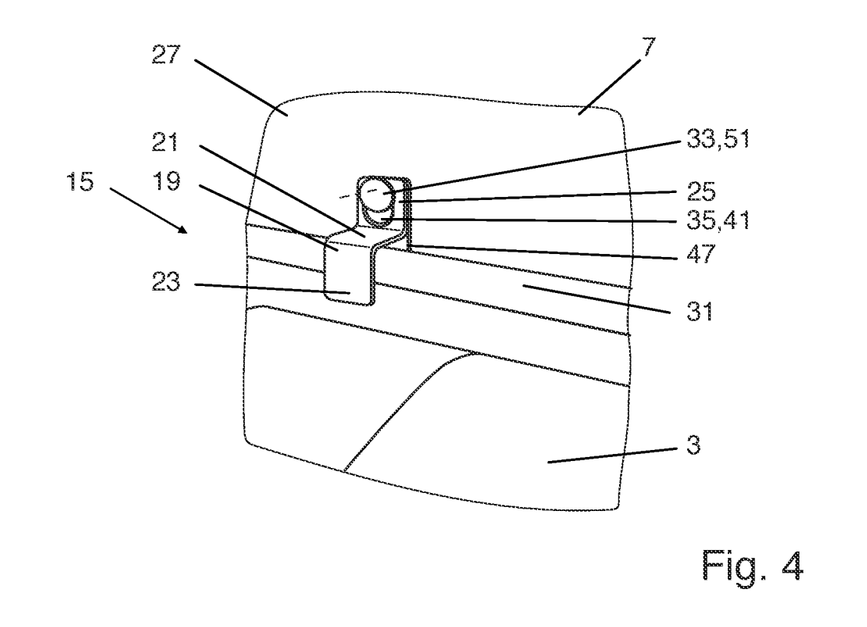
FIG. 4 is a perspective view of the mounting device of FIG. 3 engaged with the upper edge of the base member.
Figure 5:
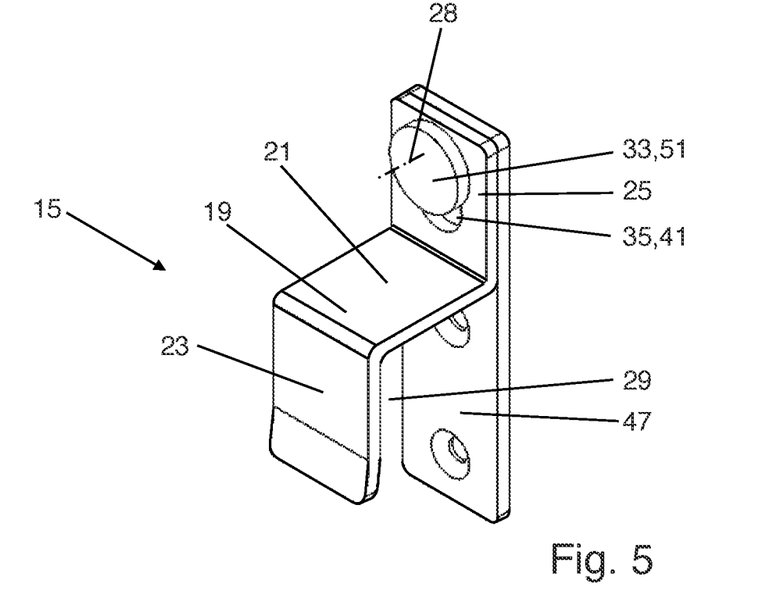
FIG. 5 is an isolated perspective view of the mounting device of FIG. 3.
Figure 6:
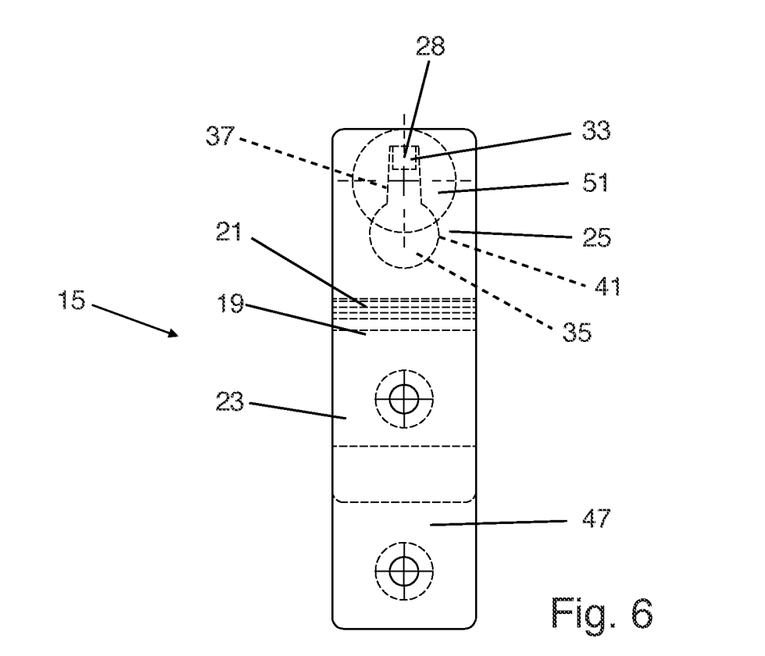
FIG. 6 is an isolated front view of the mounting device of FIG. 3.

As shown e.g. in FIG. 3, the pin 33 is mounted to the inner surface 27 of the armrest member 7 by a mounting plate 47 on which the pin 33 is formed and which is fixed to the inner surface 27 of the armrest member 7 by screws 49. The gap 29 to receive the upper edge 31 of the base member 3 is formed between the mounting plate 47 and the first flange portion 23. Further, the pin 33 has a mushroom shape with an extended-diameter head 51 at its free end to secure the pin 33 in the hole 35 and prevent it from slipping out of the hole 35.

Figure 7:
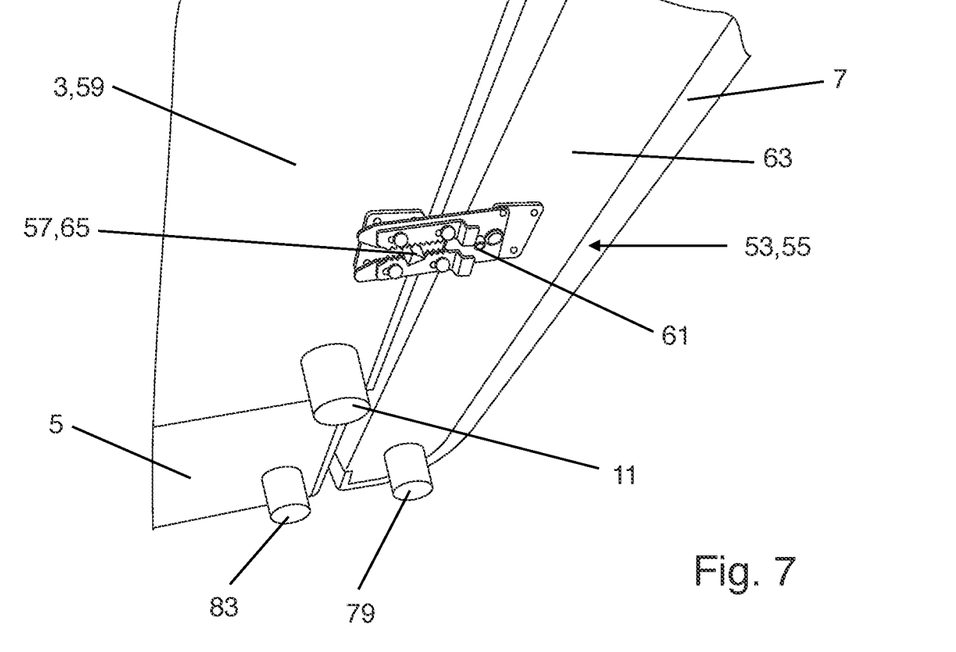
FIG. 7 is a perspective view of a second mounting device of the seating furniture of FIG. 1.
Figure 8:
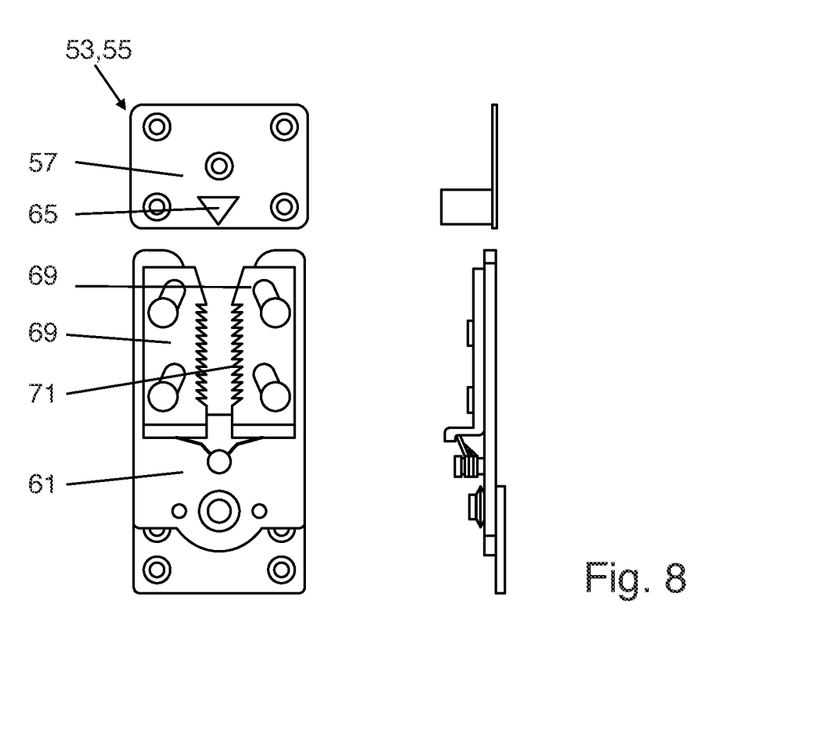
FIG. 8 is an isolated top and side view of the second mounting device of the seating furniture of FIG. 1.

As shown in FIGS. 7 and 8, the second mounting device 17 includes a latching connection 53 in the form of a ratchet connection. Specifically, the second mounting device 17 includes a crocodile clip mechanism 55 comprising a first part 57 mounted to the bottom side 59 of the base member 3 and a second part 61 mounted to the bottom side 63 of the armrest member 7 and engaging the first part 57. The first part 57 includes a latch pin 65 having a triangular cross section and extending vertically downwards. The second part 61 includes two opposite toothed latch elements 69 in the form of rods with teeth 71 at one longitudinal side, biased towards each other and engaging the latch pin 65 from opposite sides with their teeth 71, so that after engagement relative movement of the first and second parts 57, 61 in a first direction into further engagement is permitted, while relative movement of the first and second parts 57, 61 in the opposite second direction out of engagement is inhibited.

Figure 9:
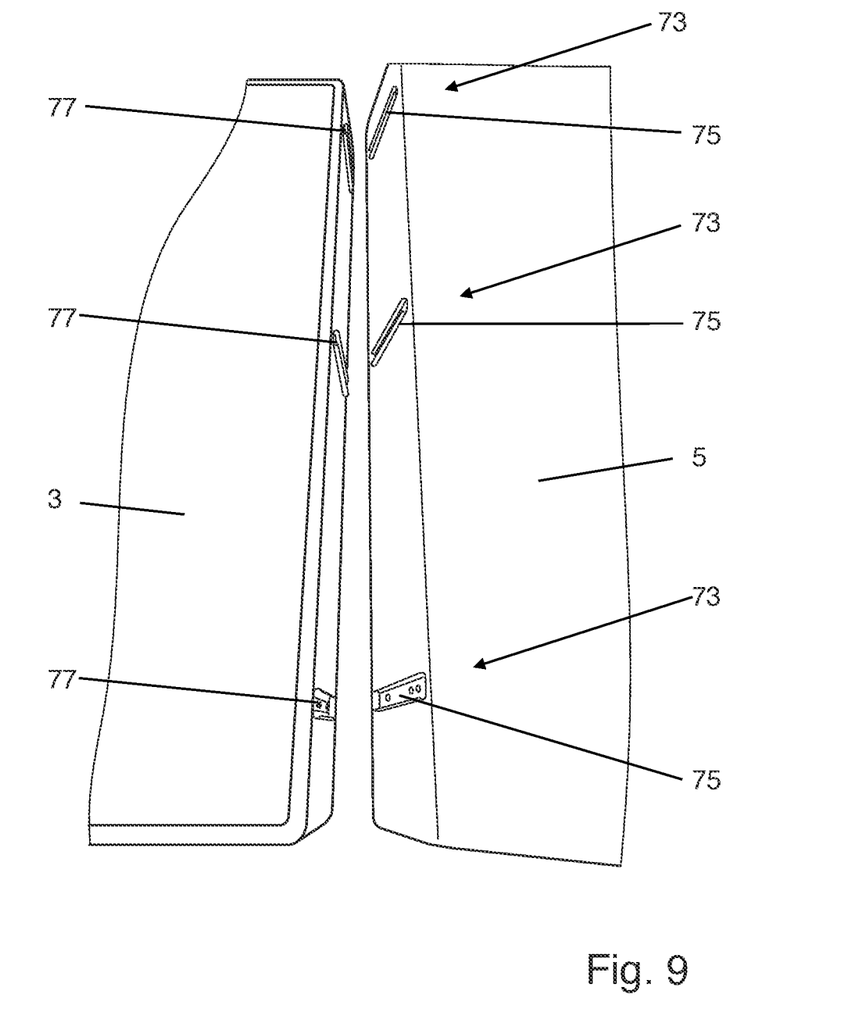
FIG. 9 is a perspective view of three bayonet bracket mechanisms for mounting the backrest member to the base member of the seating furniture of FIG. 1.

As shown in FIG. 9, the backrest member 5 is mounted to the base member 3 by three bayonet bracket mechanisms 73 spaced in the horizontal width direction of the seating furniture 1, each bayonet bracket mechanism 73 including a first bayonet bracket 75 mounted to the backrest member 5 and a second bayonet bracket 77 mounted to the base member 3. First and second bayonet brackets 75, 77 are engageable to one another in a sliding manner.

The armrest member 7 comprises a floor support 79 configured for direct stand and support on the floor 13, as shown in FIG. 7. Likewise, the backrest member 5 comprises a floor support 83 configured for direct stand and support on the floor 13. In such a way, the armrest member 7 and the backrest member 5 carry their own weight and the bayonet bracket mechanisms 73 do not need to transfer vertical loads.

When the seating furniture 1 is to be assembled and the armrest member 7 is to be mounted to the base member 3, first and second mounting devices 15, 17 are each brought into engagement. To engage the first mounting device 15, the angled part 19 is slid into the upper position and rotated into the release position. Then, the armrest member 7 is positioned with its inner surface 27 against the lateral side of the base member 3, such that the upper edge 31 of the lateral side of the base member 3 is positioned below the angled part 19. Now, the angled part 19 is rotated downwards into the locking position and subsequently slid downwards into the lower position, so that the upper edge 31 of the base member 3 is received in the gap 29, and the first flange portion 23 holds and secures the upper edge 31 and thus the entire base member 3 against the armrest member 7 in the horizontal width direction. Before or after the engagement of the first mounting device 15, the second mounting device 17 is engaged by latching a latching connection 53 to provide a further horizontal fixture of the armrest member 7 against the base member 3.

In such a way, a quick and easy mounting of the armrest member 5 to the base member 3 is enabled, which in turn enables a quick and easy assembly of the seating furniture 1. At the same time, a reliable connection between the armrest member 7 and the base member 3 is established at reasonable costs.

While in the example described above the first and second mounting devices 15, 17 are employed to mount the armrest member 7 to the base member 3, it is also possible to employ the first and second mounting devices 15, 17 to mount the backrest member 5 to the base member 3 to replace or complement the above described bayonet bracket mechanism 73. Further, the present disclosure might be transferred to the connection of two furniture components in general. Specifically, the seating furniture according to the disclosure as described above with the first and second mounting devices 15, 17 mounting the armrest member 7 to the base member 3, might also be transferred to a general furniture piece wherein the first and second mounting devices 15, 17 are employed to mount a first furniture component to a second furniture component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seating furniture comprising:
a base member,
a backrest member mounted to the base member, and/or at least one armrest member mounted to the base member,
wherein the armrest member and/or the backrest member is mounted to the base member by at least one first mounting device and at least one second mounting device,
wherein the first mounting device is spaced from the second mounting device in a vertical direction,
wherein the first mounting device fixes the armrest member and/or the backrest member to the base member with respect to at least one horizontal direction,
wherein the second mounting device fixes the armrest member and/or the backrest member to the base member with respect to the at least one horizontal direction,
wherein the first mounting device comprises an angled part having a web portion and at least a first flange portion, the angled part is mounted to the armrest member and/or to the backrest member in such a way that the web portion extends away from an inner surface of the armrest member and/or of the backrest member and the first flange portion extends spaced from the inner surface of the armrest member by a gap,
the angled part is mounted to the armrest member and/or to the backrest member in such a way that the angled part is slidable in parallel to the inner surface of the armrest member and/or of the backrest member between a first position and a second position, the angled part is mounted to the armrest member and/or to the backrest member in such a way that at least in the first position the angled part is rotatable relative to the armrest member and/or to the backrest member about an axis of rotation transverse to the inner surface of the armrest member and/or of the backrest member between a locking position and a release position,
wherein in the locking position the first flange portion extends downwards from the web portion to receive an upper edge of the base member in the gap between the first flange portion and the inner surface of the armrest member and/or of the backrest member, and
wherein in the release position the first flange portion extends sidewards or upwards from the web portion to release the upper edge of the base member from the gap.

2. The seating furniture of claim 1, wherein the angled part has a second flange portion at the end of the web portion opposite from the first flange portion,
wherein the second flange portion is mounted to the inner surface of the armrest member and/or of the backrest member.

3. The seating furniture of claim 2, wherein the second flange portion is mounted to the inner surface of the armrest member and/or of the backrest member by a pin extending from the inner surface of the armrest member and/or of the backrest member and engaging with a hole in the second flange portion.

4. The seating furniture of claim 3, wherein the hole is a slotted hole, so that the second flange portion can be slid relative to the pin guided along the slotted hole.

5. The seating furniture of claim 4, wherein the hole has a key-hole shape with a slot portion at the upper end and a round portion at the lower end, and
wherein the pin has a non-circular cross section having at least two different diameters including a greater diameter and a smaller diameter,
wherein the hole and the pin are formed such that the width of the slot portion is greater than the smaller diameter but smaller than the greater diameter of the pin, and the diameter of the round portion is greater than the greater diameter of the pin.

6. The seating furniture of claim 5, wherein the pin has a square-shaped cross section with the greater diameter in a diagonal direction and the smaller diameter in a main direction parallel to a side.

7. The seating furniture of claim 3, wherein the pin is mounted to the inner surface of the armrest member and/or of the backrest member by a mounting plate on which the pin is formed and which is fixed to the inner surface of the armrest member and/or of the backrest member.

8. The seating furniture of claim 7, wherein the gap is formed between the mounting plate and the first flange portion.

9. The seating furniture of claim 3, wherein the pin has a mushroom shape with an extended-diameter head at its free end to secure the pin in the hole.

10. The seating furniture of claim 1, wherein the armrest member and/or the backrest member is mounted to the base member by at least two first mounting devices spaced from one another along the upper edge of the base member.

11. The seating furniture of claim 1, wherein the second mounting device includes a latching connection, in particular in the form of a ratchet connection or a snap connection.

12. The seating furniture of claim 11, wherein the second mounting device includes a crocodile clip mechanism comprising a first part mounted to one of the base member and the armrest member and/or the backrest member, and a second part mounted to the other one of the base member and the armrest member and/or the backrest member and engaging the first part, wherein the first part includes a latch pin, and
wherein the second part includes two opposite toothed latch elements biased towards each other and engaging the latch pin from opposite sides with their teeth.

13. The seating furniture of claim 1, wherein the armrest member comprises a floor support and/or the backrest member comprises a floor support, configured for direct stand and support on the floor.

14. The seating furniture of claim 1, wherein the armrest member is mounted to the base member by the at least one first mounting device and the at least one second mounting device, and wherein the backrest member is mounted to the base member by at least one bayonet bracket mechanism including a first bayonet bracket mounted to the backrest member and a second bayonet bracket mounted to the base member, wherein first and second bayonet brackets are engaged to one another in a sliding manner.

* * * * *